May 19, 1970
B. WARSZAWSKI
3,513,032
ELECTROLYTIC CYCLE FOR A FUEL CELL HAVING A
SEMI-PERMEABLE MEMBRANE
Filed Feb. 26, 1968
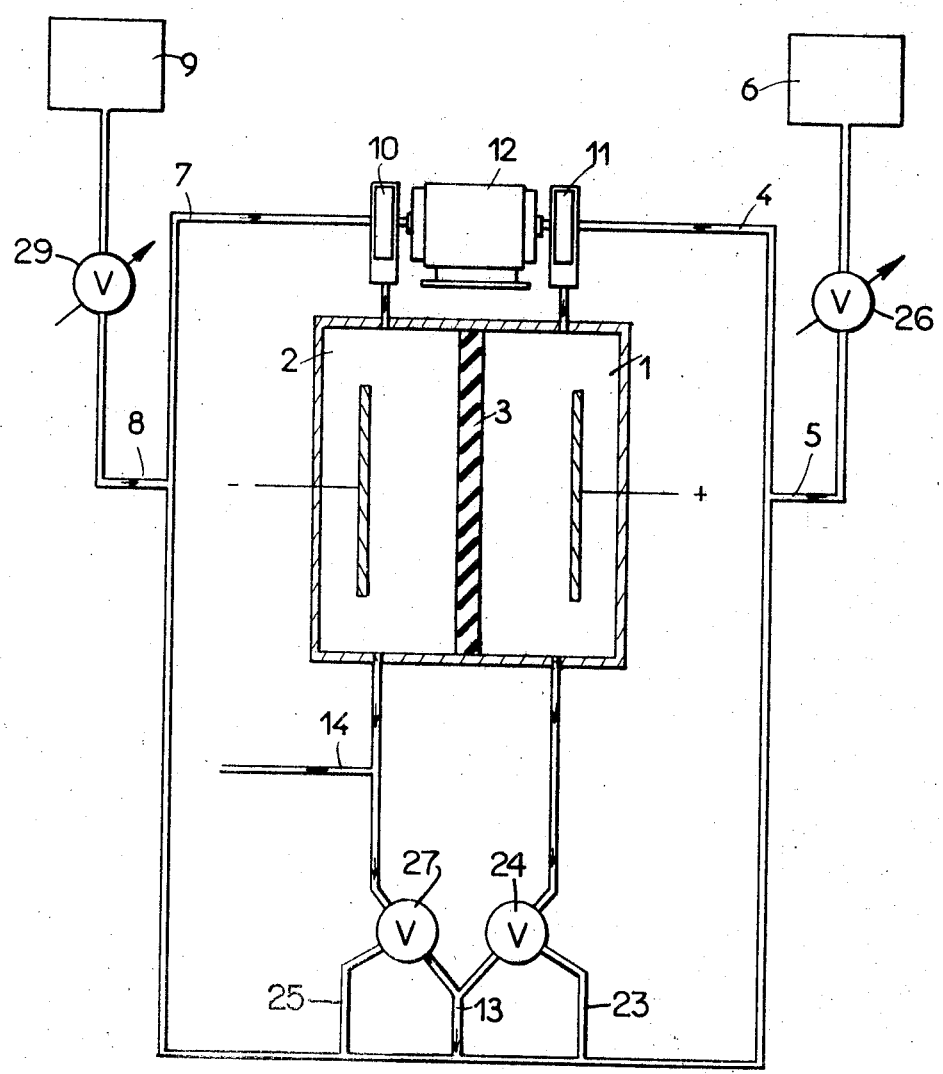
BERNARD WARSZAWSKI,
Inventor
by Stephen H. Frishauf
Atty

3,513,032
ELECTROLYTIC CYCLE FOR A FUEL CELL HAVING A SEMI-PERMEABLE MEMBRANE

Bernard Warszawski, Paris, France, assignor to Societe Generale de Constructions Electriques et Mecaniques (Alsthom), Paris, France, a corporation of France
Filed Feb. 26, 1968, Ser. No. 708,034
Claims priority, application France, Feb. 24, 1967, 2,736
Int. Cl. H01m 27/26
U.S. Cl. 136—86                 4 Claims

ABSTRACT OF THE DISCLOSURE

Two loops, an anodic and a cathodic loop of an electrolytic cycle for a fuel cell are joined at a common trunk line, so that anodic and cathodic electrolyte is mixed together, and imbalance of reagents in the anodic and cathodic branches is overcome; by adjustment of addition of reagents, for full consumption during passage through the cell, undesired mixing of anodic and cathodic reagents can be avoided. Additionally, bypasses can be provided so that only a portion of the anodic and cathodic electrolyte is mixed.

---

The present invention relates to fuel cells, and more particularly to fuel cells in which a pair of half-cells are separated by a semi-permeable membrane, and each one of the half-cells is supplied with electrolyte, having a suitable reaction agent added thereto.

Fuel cell batteries are known that can consume reagents constituted by any of the following: (a) soluble regenerated oxidation-reduction systems; (b) soluble non-regenerated oxidants and reductants; (c) gaseous or liquid oxidants and reducing agents that are insoluble in the electrolyte; (d) an oxidant belonging to one of the above categories and a reductant belonging to another of these categories. Each of the above reagents is either dissolved or suspended or emulsified in an electrolyte.

Each cell is made of two half-cells separated by a semi-permeable membrane, and the electrolyte carrying one of the reagents circulates through one of the half-cells, while the electrolyte carrying the other reagent circulates through the second half-cell.

The electrolytic circuit may be open, in which case it is necessary to have a solvent reserve to supply the electrolyte; or the electrolytic circuit may be closed, in which case the electrolyte or portions of electrolyte are recycled after having traversed regenerating devices.

Closed electrolyte cycles require that the electrolytes or portions of electrolytes, which perform a certain number of functions, must remain unchanged at the end of each cycle. One solution is to provide two independent loops, one for the anodic electrolyte or portion of the anodic electrolyte, the other for the cathodic electrolyte or portion of the cathodic electrolyte; each loop passes through all of the corresponding half-cells, and is provided with a feed device placing the corresponding reagent with the solution or emulsion and, if desired, with a separating device to remove reaction byproducts. This form of closed cycle is simple, and the most commonly used, but it involves a number of difficulties.

A first and very serious difficulty arises from the presence of the membrane. If an oxidation-reduction reaction is considered as the oxidation of hydrogen by oxygen, or of hydrazine by oxygenated water, it will be seen that the overall reaction does not involve any acid or base, but that the electrochemical reduction of the oxidant is accompanied by the production of OH⁻ ions (or the consumption of H⁺ ions), whereas the oxidation of the reductant is accompanied by the consumption of an equal quantity of OH⁻ ions (or by the production of an equal quantity of H⁺ ions). For example, in a basic medium:

EXAMPLE 1

At the cathode:

$$O_2 + 2H_2O + 4e \rightarrow 4OH^- \quad (1)$$ 

At the anode:

$$2H_2 + 4OH^- - 4e \rightarrow 4H_2O \quad (2)$$ 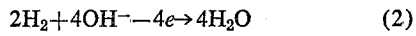

Overall reaction:

$$O_2 + 2H_2 \rightarrow 2H_2O \quad (3)$$ 

($e$ = electrons)

EXAMPLE 2

At the cathode:

$$2H_2O_2 + 4e \rightarrow 4OH^- \quad (4)$$ 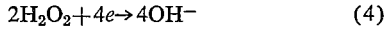

At the anode:

$$N_2H_4 + 4OH^- - 4e \rightarrow N_2 + 2H_2O \quad (5)$$ 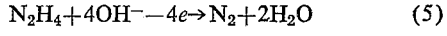

Overall reaction:

$$2H_2O_2 + N_2H_4 \rightarrow N_2 + 2H_2O \quad (6)$$ 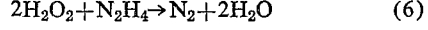

($e$ = electrons)

The same holds true for a large number of oxidant-reductant pairs.

These relationships are true for many diverse mediums, whether basic, acidic, or buffered. For convenience and economy, the background and the invention will be explained with reference to a basic medium, but all of what follows may be readily transposed in terms of an acidic medium or of a medium buffered with a buffer mixture.

In the case of a cell that does not have a membrane, the reconstitution of the then single electrolyte, which increases in alkalinity on one electrode and is correspondingly depleted on the other, occurs locally largely through motions by natural convection or the like, and the base concentration of the electrolyte is uniform, except in the immediate proximity of the electrodes. This is not the case in a cell with a membrane. In effect, convective motion across the membrane is impossible. The only possible mechanism of local reconstitution is the migration of OH⁻ ions from the half-cell in which they are produced to the half-cell in which they are consumed, through the membrane, under the effect of the electrical field. However, as the above-mentioned partial reactions show, since for each electron exchanged an OH⁻ ion is produced or exchanged, the transport number of the OH⁻ ions through the membrane would have to equal 1 for the base concentrations to remain constant in the half-cells. But then a perfect anionic selectivity membrane does not exist, and in any case it has become apparent that for reasons of conductivity the non-selective membranes may often be preferable. From this it follows that the transport number of OH⁻ ions is generally less than 1 and that there is no complete compensation. Thus, while traversing the cell, the base concentration of the electrolyte diminishes in the anodic electrolyte portion and increases in the cathodic electrolyte portion.

This phenomenon recurs with each new cycle, and the discrepancy in base concentration increases. Ultimately, a steady state is established in which the passage of OH⁻ ions through the membrane by migration and by diffusion under the influence of the induced concentration gradient exactly compensates for the production of these ions in the cathodic half-cell and their consumption in the anodic half-cell. But the thus attained equilibrium of OH⁻ ions in the anodic loop is often so low that the cell's actual power output is reduced to a negligible level.

Other difficulties arise in connection with the permanent transfer of water from one loop to the other as a result of the solvation of the ions passing through the membrane;

this transfer modifies the concentrations and volumes of the loops and further complicates the problem of removing reaction products.

It is an object of the invention to provide an electrolyte cycle for fuel cells in which the preceding difficulties can be avoided.

Subject matter of the present invention

Briefly, and instead of splitting the electrolytic cycle into two independent loops, two barnch loops are joined in a single trunk at the bottom of the cell and then again separated. The single branch permits the mixing of the electrolytes as they come out of the cell, and consequently assures their reconstitution or rehomogenization from the acid-base standpoint. Also assured is the rehomogenization of the electrolytes from the standpoint of the water, or more generally of the solvent, and the rehomogenization of all components present in solution. Separation of components, and inhomogeneity of the electrolyte thus is not additive, from one cycle to the next, and the concentration of electrolytes at the inlet of the cell is the same in each branch of each loop regardless of the numbers of passes of any given electrolyte element through the cell.

The attached single figure of the drawing illustrates, with the following description, a non-limiting example of an embodiment of the invention.

The fuel cell is made up of two half-cells: cathode half-cell 1 and anode half-cell 2, separated by a semi-permeable membrane 3. A cathodic electrolyte circulates in a closed loop 4 and is fed, by a conduit 5, a reagent flowing from a reservoir 6. Likewise, an anodic electrolyte circulates in a closed loop 7 and is fed, by a conduit 8, a reagent flowing from a reservoir 9. Pumps 10 and 11, driven by an electric motor 12, assure circulation of electrolyte. The two loops 4 and 7 are joined together to form a single trunk 13 situated at the bottom of half-cells 1 and 2. Reaction byproducts are eliminated, for example at pipe 14.

Aside from the above-mentioned advantages, the electrolytic cycle with mixing of the cathodic and anodic branches presents still other advantages. In particular, it is clear that whatever the actual site of the formation of soluble reaction byproducts (water, possible mineral salts, etc.), such byproducts may be removed at any point in the cycle that is found to be the most convenient. Moreover, such a cycle is stable: local disturbances are resorbed automatically.

Mixing of electrolytes at the outlet of the cell results in an energy loss due to neutralization, or due quite simply to the flow into the other loops of reagents that have not undergone reaction in the cell. This loss can be minimized by arranging for the maximum possible consumption of injected reagents during the course of electrolyte flow through the cell. To this end, the amount of reagent is adjustable by means of valves 26, 29, manually, or automatically, for example in dependence on load placed on the cell.

If the non-consumed residue is still found excessive, this loss may be reduced by effecting only a partial mixture of electrolytes rather than a total mixture. A partial mixture can be obtained by feeding only a fraction $1/n$ of the total flow from each loop into the common trunk, rather than its entire amount. Further, an acidic-basic buffer concentration (acid, base, or buffer mixture) can be added to the initial electrolyte such that the concentration of the least concentrated component, in its normal state, is, at the inlet of the cell just sufficient. Under these conditions the energy loss due to mixing will be no more than the fraction $1/n$ of the loss that would occur in the case of total mixture. Bypass valves 24, 27, and connection lines 23, 25 reduce the portion of the electrolyte being applied to common trunk 13.

I claim:
1. A fuel cell having a semi-permeable membrane dividing the cell into an anodic half-cell and a cathodic half-cell, in combination with means supplying electrolyte to the cell, comprising
   means to circulate the anodic electrolyte in a first closed loop including the anodic half-cell;
   means circulating the cathodic electrolyte in a second closed loop including the cathodic half-cell;
   injection means connected to at least one of said loops to inject a reagent into the electrolyte in the loop;
   and a common trunk connection connected to the respective outlets of both said half-cells, said trunk being common to, and forming part of said two loops in which the electrolyte circulates and providing for mixing of electrolyte derived from said two loops.
2. The combination of claim 1, including means to branch said trunk for connection to said half-cells forming part of said two loops.
3. The combination of claim 1, wherein said common trunk, forming part of both loops, is connected to circulate only a portion of the flow from the two loops.
4. The combination of claim 1, including means regulating the injection of said reagents, respectively, into said loops, to respectively provide for maximum consumption of reagents in the fuel cell and prevent intermixing of unspent reagents in said common trunk.

References Cited

UNITED STATES PATENTS

| | | | |
|---|---|---|---|
| 3,322,574 | 5/1967 | Justi et al. | 136—86 |
| 3,375,139 | 3/1968 | Tschenkel et al. | 136—86 |
| 3,436,271 | 4/1969 | Cole et al. | 136—86 |

ALLEN B. CURTIS, Primary Examiner

U.S. Cl. X.R.

136—160